United States Patent Office 3,227,938
Patented Jan. 4, 1966

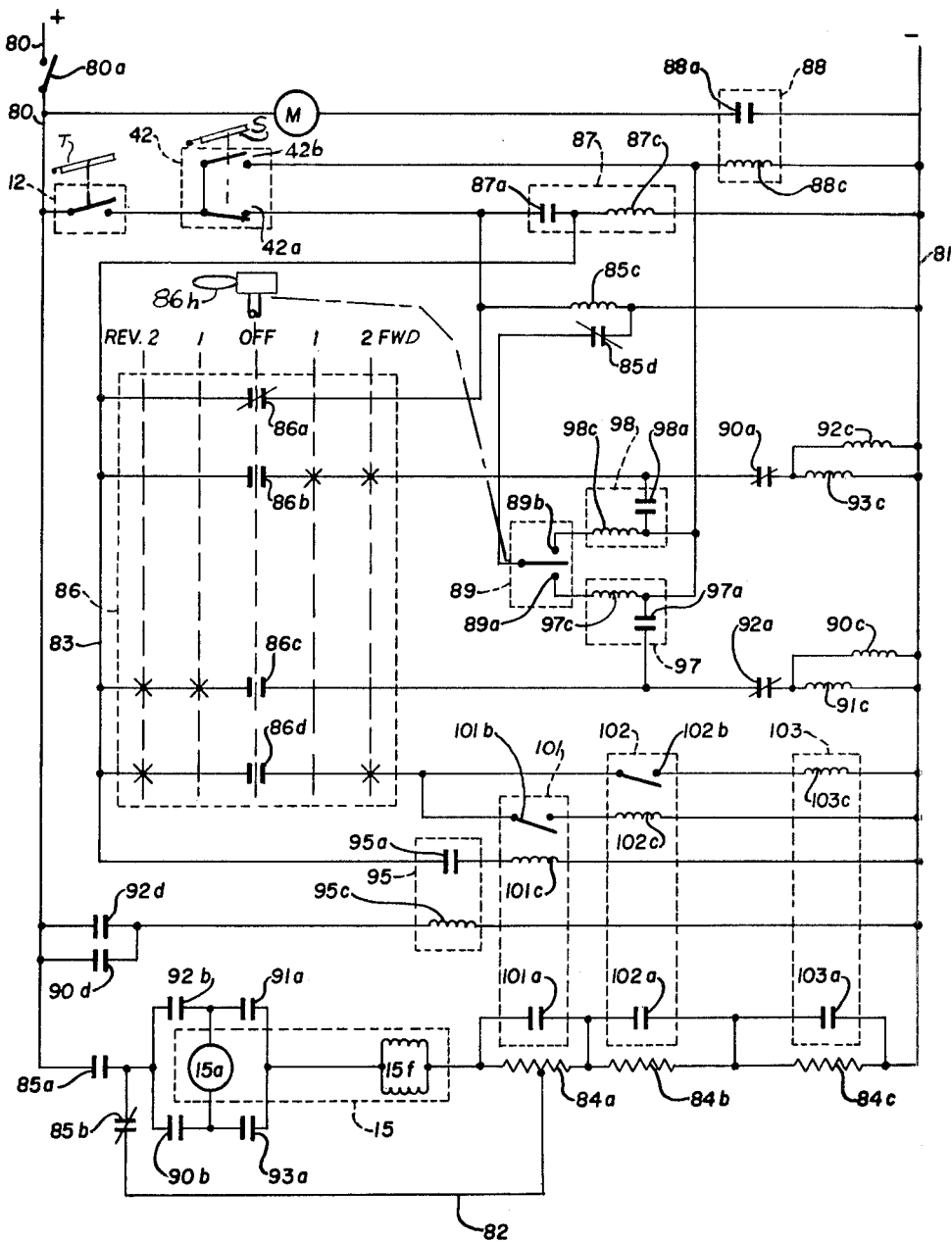

3,227,938
DYNAMIC BRAKING SYSTEM FOR
INDUSTRIAL TRUCKS
John A. Draxler, Berea, Ohio, assignor to The Elwell-Parker Electric Company, Cleveland, Ohio, a corporation of Ohio
Original application Apr. 1, 1958, Ser. No. 725,705, now Patent No. 2,974,764. Divided and this application June 7, 1960, Ser. No. 34,467
3 Claims. (Cl. 318—261)

This application is a division of application Serial No. 725,705, filed April 1, 1958, now U.S. Patent Number 2,974,764.

The present invention is concerned with vehicular braking systems and more particularly with dynamic systems for industrial trucks or the like for heavy trucks.

In electric motor driven industrial trucks and the like, by the inclusion of dynamic braking, since less mechanical or hydraulic braking force is normally required to achieve the desired rapidity of service braking action, not only are problems of wear and maintenance in the service brake system are ameliorated, but also in consequence of the use of lower hydraulic and mechanical forces there is attained a smoother braking, minimizing the likelihood of brake grabbing with its usually attendant dangerous possibility of load shifting. Also in the case of service brake failure, dynamic braking reduces the brake force application required on the drive shaft by an emergency mechanical brake acting through the drive shaft, and consequently reduces the otherwise large torsional stresses and wear in the drive system gear train. Particularly in large trucks of this character, dynamic braking is very desirable.

The general object of the present invention is to provide an improved dynamic braking system for electric industrial trucks and the like. A further object is the provision of a dynamic braking system which has not only the above noted general advantages of dynamic braking, but also includes means actuated by the usual directional control devices whereby dynamic braking circuit branches are automatically connected in proper polarity for either direction of travel without need of a specific operator manipulation of controls for direction selectivity in use of dynamic braking.

In addition to the aforestated objects and advantages of this invention others will appear from the following description and the drawing, which drawing is a simplified schematic diagram of appropriate circuitry for the electrical controls in the form of dynamic braking system of this invention used in conjunction with a known form of vehicle direction and speed control.

In the particular arrangement here shown, a known treadle structure T, for a "dead-man" control type emergency and parking mechanical brake, is arranged to actuate switch 12, to closed condition when the treadle is depressed as by the operator's weight, and otherwise opened with the treadle raised to cut off electric power to the vehicle drive motor (or motors) 15 as will be described. A power hydraulic service brake system is assumed, which includes a hydraulic fluid pump driven by electric motor M.

Lines 80, 81 represent main power leads from positive and negative terminals respectively on a truck battery, with conveniently located manual emergency switch 80a (considered closed in all further discussion) included in line 80 before all other elements.

The vehicle drive motor 15 is a series motor represented by armature 15a and field 15f, the power circuit of which includes the travel accelerating resistors 84a, 84b, 84c between line 81 and the field; the power switch 85a; and various solenoidally operated switch means whereby the polarity of the armature relative to the field and switch 85a may be changed to obtain forward and reverse vehicle drive, and whereby resistors 84a–c between field and line 81 may be shorted out for acceleration, as hereinafter described, through manual operation and setting of main travel controller 86 by such means as an operating handle 86h. For a truck where a simultaneously operating plurality of propulsion motors are used, 15f will represent parallel connected fields and 15a series connected armatures of such motors.

A dynamic braking circuit, including armature, field and a motor shunting load resistance, is provided by line 82 connected from a center or intermediate tap of resistor 84a, through shunting switch 85b to the armature side of contacts 85a.

Between line 80 and line 81 there are successively connected in series the normally open parking brake switch 12, the normally closed switch 42a of an hydraulic service brake switch unit 42, the normally open contacts 87a and solenoid coil 87c of a relay 87. The elements of switch 42 are actuated to non-normal condition upon operator pressure on a service brake pedal S. The normally open switch 42b, commonly connected with 42a to switch 12, is connected in series with coil 88c of a relay 88 to line 81, the relay having normally open contacts 88a in series with the hydraulic power brake pump motor M between lines 80, 81 for power brake pump operation. It may be here noted that switch 12 is open and closed respectively when the treadle 11 is up and down; and that 42a is closed and 42b open when as in the drawing the service brake pedal is released or not depressed, but are respectively opened and closed upon initial downward movement of the pedal.

The aforementioned switches 85a and 85b are respectively normally open and closed contact pairs of a solenoidally operated contactor unit, including also normally closed contacts 85d, and having operating solenoid 85c connected between line 81 and a point between 42a and 87a.

A two point selector switch 89 is mechanically linked with traveler controller 86, so that when the latter is at "off" position, switch 89 is open or at a neutral position, but with controller 86 at forward or reverse setting the selector switch is set to contacts 89a or 89b respectively.

In the master controller 86, the normally closed switch 86a, in parallel with relay contacts 87a, is closed only at neutral or "off" position; the normally open forward direction switch 86b is closed at both first or second forward speed settings; normally open reverse direction switch 86c is closed at both first and second reverse speed settings; and normally open switch 86d is closed at either forward or reverse second speed settings, the closed condition of each switch for each setting being indicated by an "X" at the dashed vertical line indicating each setting.

The left side of each switch in 86 is connected by line 83 to a point between coil and contacts of relay 87. In a forward direction control circuit branch, the other side of switch 86b is connected through normally closed contacts 90a of a reverse drive contactor unit to the parallel forward drive solenoid coils 92c, 93c in turn connected to line 81. The solenoid 92c is part of a forward contactor unit including normally closed contacts 92a in the reverse control branch; normally open contacts 92b connected between a first one end of the armature and common connection of 85a, 85b; and normally open contacts 92d. The solenoid 93c is part of a second forward contactor unit with normally open contacts 93a between the second end of the armature and the field. The reverse direction control branch analogously to the forward branch, includes 86c, the aforementioned normally closed contacts 92a, and the parallel solenoids 90c, 91c of first and second reverse control contactor units. However, the normally open contacts 90b of solenoid 90c are connected to the same end of armature 15a as 93a and to 85a, 85b; while normally open contacts 91a of solenoid 91c are connected to field 15f and the same end of the armature as 92b.

Although further details of acceleration and speed control are not per se part of this invention, a simplified showing of a known system is briefly described.

Solenoid 90c also has normally open contacts 90d in parallel with 92d, the pair being connected in series with one coil 95c of a plugging relay 95 having a second coil (not shown) with field opposed to the first connected from 90d, 92d to the armature side of field 15f, the function of which omitted element is not here of concern. The contacts 95a of relay 95 however are connected in series with the solenoid 101c of relay 101, between lines 81 and 83; the contactor unit 101 having normally open shunting contacts 101a across resistor 84a, and normally open time delay contacts 101b. Connected successively in series from line 83 to 81 are controller switch 86d, contacts 101b, and the solenoid 102c of a contactor unit 102, having normally open shunting contacts 102a across resistor 84b and normally open time delay contacts 102b. Contacts 102b and the solenoid 103c of contactor unit 103 are connected in series with each other as a circuit branch in parallel with 101b and 102c, the normally open shunting contacts 103a of 103 being connected across resistor 84c.

Thus, initially upon closure of the motor power circuit with either polarity of the motor, all three resistors are in the circuit for low speed at controller setting 1, but closure of 90d or 92d energizes and closes 95 relay, energizing 101 to shunt out 84a for further acceleration; however 84b and 84c cannot be shunted out unless the controller 86 is at second speed setting of forward or reverse. In either of the latter two settings 86d is closed, hence closure of 101b energizes 102 to shunt out 84b, causes delayed closure of 102b for a subsequent energization of 103 and thereupon shunting out the last resistor 84c as well for full acceleration.

Considering direction control as thus far set forth, and assuming parking brake switch 12 closed, and service brake released and all brakes off, therefore 42a closed, 42b open, with 86 at "off" position, 86a is closed, 87c energized and 87a closed and thereafter held closed irrespective of 86a, and hence power is available to the control circuits, unless either 12 is opened by release of treadle T, or 42a is opened by use of the service brake pedal for braking. Likewise 85c is energized, closing 85a to make power available to the drive motor, 85b is opened to open the dynamic braking circuit, and 85d is also held open; and such conditions are maintained until 12 or 42a is opened. Use of relay 87 with 86a in parallel with 87a opens all control circuits involving line 83 upon opening of 12 or 42a in any braking function, which circuits cannot again be energized until controller 86 is returned to "off" position to close 86a. This prevents resumption of vehicle propulsion upon closure again of 12 and 42a with the controller yet at a forward or reverse setting.

Hence when the controller is set to first or second forward speed settings, 92c and 93c are energized, closing 92b and 93a to connect the armature to field for forward travel polarity, opening 92a in the reverse branch so that faulty operation of 86c cannot cause closure of 91a and 90b to short out the armature; and also closing 92d. On reverse setting of the controller closing 86c, in similar manner energization of 90c, 91c closes 90b and 91a to reverse the motor polarity, 90a is opened in the forward branch again for motor protection against failure of 86b, and 90d is closed.

In the dynamic braking control polarity selecting circuitry, the normally closed contacts 85d are connected between line 81 and the movable contact arm of selector switch 89, the fixed contacts 89a, 89b of which are connected to an end respectively of relay coils 97c, 98c, the opposite ends of which are connected commonly to a point between switch 42b and solenoid 88c, i.e., through 42b and 12 to line 81. Said opposite ends of the relay coils 97c, 98c are respectively connected through the normally open relay contacts 97a and 98a to a point between 92a and 86c, and to a point between 90a and 86b.

Now it may be observed that with the travel controller at any forward or reverse setting, dynamic braking will occur upon depression of pedal S, which opens switch 42a and closes 42b. Opening 42a deenergizes contactor solenoid 85c to open motor power switch 85a, and to close both 85b of the braking circiut and 85d; and deenergizes control branches controlled by 86a–d, releasing whichever contactor set 92b–93a or 91a–90b was just previously involved in driving. Also current is cut off from the solenoid 101c to open 101a, so that resistor 84a is not shunted. Closing 42b (which also starts the power brake hydraulic pump motor M by energizing 88c to close 88a), then provides current to the dynamic braking polarity selecting circuit.

Assuming that 86 is at a forward setting, selector switch 89 however is at contact 89a to energize 97c, therefore closing 97a upon closure of 85d. Hence reverse solenoids 90c, 91c are energized to close 90b and 91a, reversing the armature-field polarity as required for dynamic braking of the forwardly moving vehicle. Had the vehicle been driving in reverse when brakes were applied, then switch 89 being set at 89b, coil 98c would be energized to close 98a, hence energizing 92c, 93c to close 92b, 93a for requisite braking polarity. The inclusion of 85d contacts in the selector circuitry is merely a safeguard against motor field damage, by a failure at unit 42 permitting 42a and 42b to be simultaneously closed, or likewise at 89, which otherwise might cause 90b, 91a, 92b, 93a to be closed simultaneously under some operating conditions or control settings, just as 90a, 92a protect the motor against certain controller element failures.

Hence for any drive setting of controller 86, the selector switch 89 with relays 97, 98, and switch 42b provide circuitry immediately ready for appropriate dynamic braking setting of contactor switches 90b, 91a, 92b, 93a, upon use of the pedal S, the latter contactor switches therefore serving also as dynamic braking polarity switches. Switch 89 with associated relays 97, 98 likewise may be considered switch means selectively determining motor polarity relations for dynamic braking, upon closure of dominating switch 42b.

Depending upon what mode of operation is desired, the power braking and dynamic braking can be designed to be initiated substantially simultaneously; or for initiation of dynamic braking at a first point of pedal depression, with power braking not beginning until the pedal is depressed somewhat further.

As far as the mechanical parking brake operation is concerned, in normal use when the operator gets into the operating station standing on treadle T, the parking brake is released in known fashion and switch 12 is closed to make power available to the control circuits as noted. When the truck is stopped and the operator leaves his station in the vehicle, the treadle rises for mechanical brake engagement, and switch 12 opens to cut off power from the control circuits. Should the operator leave the platform for any cause while the truck is in motion, then of course the "dead-man" control feature of the brake appears, the brake in like manner being applied to bring the truck to a halt at the same time that opening of switch 12 cuts off power to all the control circuits, thereby cutting off electric power to the motor irrespective of travel controller setting.

I claim:

1. In an industrial truck having an electric vehicle propulsion motor, drive torque transmitting means between the motor armature and vehicle drive wheels, a service brake pedal, and propulsion motor electrical control means including a manually operated direction controller and solenoidal switches controlled thereby for connecting the motor armature and field selectively in each of two mutually reversed polarities for opposite directions of propulsion by respective direction settings of said controller, an electro-dynamic braking system comprising: electro-dynamic motor braking circuit means including said solenoidal switches and a motor shunting resistance circuit branch having a shunting switch therein; and dynamic braking control means including a switch unit having a normally closed first switch and normally open second switch, said unit being actuated to non-normal switch settings by depression of said brake pedal, said first switch when open cutting off power through said controller and thereby to solenoids of said solenoidal switches controlled thereby, a dynamic braking polarity selector circuit including said second switch and selector switch means mechanically connected to said controller to selectively energize the solenoids of said solenoids switches upon closure of said second switch for a motor polarity opposite that attained for propulsion by a prevailing controller setting, and means controlled by said switch unit for opening said shunting switch when power is supplied to said controller and for closing said shunting switch upon actuation of the unit.

2. In an industrial truck having an electric vehicle propulsion motor, drive torque transmitting means between the motor armature and vehicle drive wheels, a service brake operating pedal, and propulsion motor electrical control means including a manually operated direction controller and solenoidal switches controlled thereby for connecting the motor armature and field selectively in each of two mutually reversed polarities for opposite directions of propulsion by respective direction settings of said controller, an electro-dynamic braking system comprising: electro-dynamic motor braking circuit means including said solenoidal switches and a motor shunting resistance circuit branch having a shunting switch therein; and dynamic braking control means including a switch unit having a normally closed first switch and normally open second switch, said unit being actuated to non-normal switch settings by depression of said brake pedal, said first switch when open cutting off power through said controller and thereby to solenoids of said solenoidal switches controlled thereby, a dynamic braking polarity selector circuit including said second switch and selector switch means mechanically connected to said controller and said second switch series connected to said selector switch means and forming therewith circuit branches in parallel with said first switch and said controller to selectively energize the solenoids of said solenoidal switches upon closure of said second switch for a motor polarity opposite that attained for propulsion by a prevailing controller setting, and means controlled by said switch unit for closing said shunting switch upon actuation of the unit.

3. In an industrial truck having a reversible electric motor for driving the vehicle and including field winding means and an armature, a brake pedal, solenoidal switches connected to said motor for controlling its operation and comprising first motor switch means operative when closed to establish a current path in one direction through the armature for forward propulsion of the vehicle and second motor switch means, operative when closed to establish a current path in the opposite direction through the armature for reverse propulsion of the vehicle, forward and reverse solenoid means respectively controlling said first and second motor switch means, and a manually operable direction controller having forward and reverse propulsion positions for selectively energizing said forward and reverse solenoid means individually and alternatively, an electrodynamic braking system comprising: a motor shunting circuit branch having a shunting switch therein, a brake switch unit having a normally-closed first brake switch and a normally-open second brake switch, said brake switch being actuated to a non-normal setting in which said first brake switch is open and said second brake switch is closed by depression of said brake pedal, said first brake switch when closed completing an energization circuit through said controller for said forward solenoid means for closing said first motor switch means when said controller is positioned for forward propulsion of the vehicle and completing an energization circuit through said controller for said reverse solenoid means for closing said second motor switch means when said controller is positioned for reverse propulsion, said first brake switch when open breaking said energization circuits through the controller for the forward and reverse solenoid means, selector switch means connected electrically to said second brake switch and connected mechanically to said controller to be positioned by the latter, first control means connected to said selector switch and operable by the latter to complete an energization circuit for said reverse solenoid means so as to close said second motor switch means upon closing of said second brake switch when said controller is positioned for forward propulsion, second control means connected to said selector switch and operable by the latter to complete an energization circuit for said forward solenoid means so as to close said first motor switch means upon closing of said second brake switch when said controller is positioned for reverse propulsion, and means controlled by said brake switch unit for opening said shunting switch when said first brake switch is closed and for closing said shunting switch when said second brake switch is closed.

References Cited by the Examiner
UNITED STATES PATENTS

| | | | |
|---|---|---|---|
| 2,508,175 | 5/1950 | Krapf et al. | 318—262 |
| 2,813,240 | 11/1957 | Arnot | 318—551 |
| 3,017,555 | 1/1962 | Newman et al. | 318—380 |

ORIS L. RADER, *Primary Examiner.*

MILTON O. HIRSHFIELD, *Examiner.*